Oct. 8, 1957  E. C. J. ROBEN  2,808,808
AUTOMATIC FISH FEEDER FOR AQUARIUMS
Filed Dec. 8, 1955

INVENTOR.
EDWARD C. J. ROBEN
BY
ATTORNEY

United States Patent Office 2,808,808
Patented Oct. 8, 1957

2,808,808

AUTOMATIC FISH FEEDER FOR AQUARIUMS

Edward C. J. Roben, Paramus, N. J., assignor of fifty percent to Morison B. Jones, Yonkers, N. Y.

Application December 8, 1955, Serial No. 551,815

6 Claims. (Cl. 119—51)

My invention is directed toward fish feeder devices and the like.

In recent years, methods for breeding and raising fish, particularly tropical fish, have become of wide spread interest both to ichthyologists and hobbyists. Fish of this type are generally raised in a water filled tank or aquarium. One ever present problem in this field arises in connection with feeding fish. While these fish do not require much food and are not generally particular eaters, it has been found that if an excess of food is supplied, certain undesirable results can ensue. The uneaten food sinks to the bottom of the tank and decomposes; gases harmful to the fish are evolved and further the oxygen content of the water is decreased. This oxygen depletion, if permitted to continue for any appreciable period, is also harmful to fish. As a result, in order to prevent an oversupply of food, a measured amount of food must be supplied at periodic intervals (for example once or twice a day) to each aquarium.

Conventionally, the food is manually measured out and fed to the fish. This process is tedious and time consuming. Moreover, the fish cannot be left unattended for any extended period.

I have invented a fish feeder device adapted to automatically supply a precisely metered amount of fish food to an aquarium at periodic intervals.

Accordingly it is an object of my invention to provide a new and improved fish feeder device of the character indicated.

Another object is to provide a new and improved fish feeder device which includes a hopper containing fish food and a rotatable member which removes a metered amount of fish food from the hopper and automatically supplies this food to an aquarium at regularly spaced intervals.

Yet another object is to provide a new and improved fish feeder device in which fish food contained in a hopper is agitated or stirred at spaced intervals and the stirred food is automatically supplied in metered quantities to an aquarium at periodic intervals.

These and other objects of my invention will either be explained or will become apparent hereinafter.

In my invention a hopper containing fish food is secured to one side of an aquarium. (It can be positioned inside or outside the aquarium.) A rotatable member operatively associated with the hopper is continuously rotated through a 360° arc at a given rate in such manner that one end of this member sweeps through the food as the member is rotated through a given portion of said arc. A food receiving cup, scoop or similar receptacle secured to this one end picks up a predetermined quantity of the food as the said one end sweeps through the food. As the member completes its rotation through the said portion of the arc, means coupled to said member cause the cup to discharge the food contained therein onto the surface of the water in the aquarium.

I further provide at least one food stirrer or agitator coupled to said member and rotated in synchronization therewith to periodically stir or agitate the food in the hopper and thus prevent food particles from adhering to the inner surface of the hopper or to each other. Electric switching means serve to energize and deenergize a lamp in accordance with the position of the rotatable member and thus the surface of the water can be illuminated at periods when the food is discharged from the cup onto the water.

An illustrative embodiment of my invention will now be described with reference to the accompanying drawings, wherein.

Figure 2:
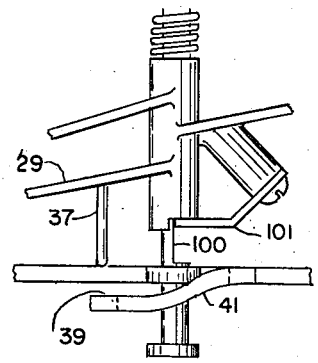
Fig. 2 is an enlarged detail view of a portion of the device shown in Fig. 1.
Figure 1:
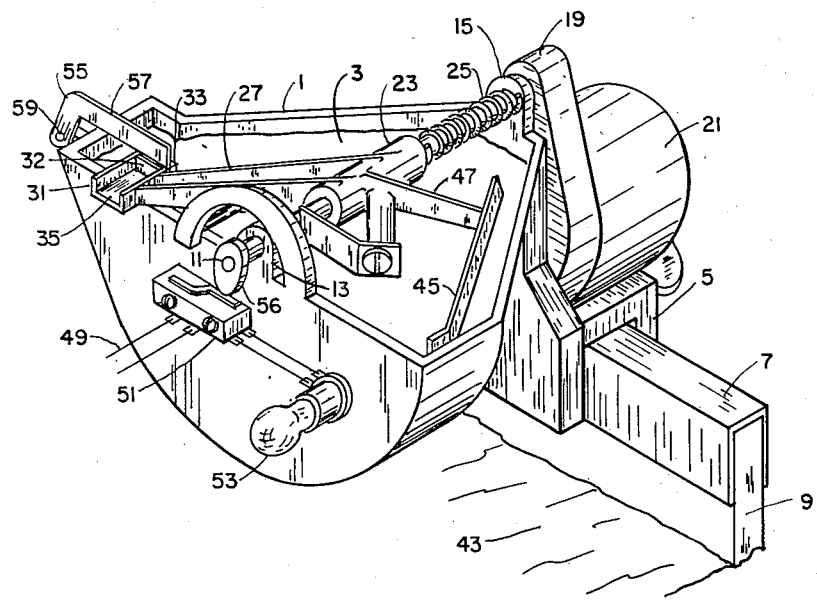
Fig. 1 is an illustrative view of my fish feeder device.

A hopper 1 containing prepared fish food particles 3 is secured by clamp 5 to a wall 7 of aquarium 9. A rotatable shaft 11 is journaled between raised portions 13 and 15 on opposite sides of hopper 1. One end 17 of shaft 11 is connected through reduction gears 19 to a driving motor 21. Motor 21 and gears 19 cause the shaft to rotate at a fixed rate, for example one or two revolutions every 24 hours.

A sleeve 23 positioned between raised portions 13 and 15 is secured to the shaft 11 and rotates therewith. This sleeve is free to move in an axial direction along the shaft. A spring 25 mounted concentrically about the shaft is interposed and compressed between the sleeve 23 and the raised portion 15.

A connecting member 27 rigidly secured at one end of the sleeve 23 extends in a generally radial direction therefrom. The opposite end of this member is connected to a food cup or scoop 31. In this example, this scoop is closed at one end 33 and is open at the other end 35.

A cam follower 37 connected at one end to connecting member 29 at a point intermediate its ends extends in a direction parallel to shaft 11. The other end of follower 37 rides on the contoured surface 39 of cam 41. This cam is secured to one side of the hopper in an area generally adjacent raised portion 13. Preferably, the cam and the hopper form an integral unit.

As the shaft is rotated under the action of the driving motor, the cup 31 is swung through and about the hopper in a plane perpendicular to the axis of shaft 11. (The dimensions and relative positions of shaft 11 and hopper 1 are such as to permit arm 27 and cup 31 to be swung through a 360° arc.) As the cup is swung out of the hopper, the camming action begins to further compress spring 25. The cup then travels through the hopper and picks up a predetermined amount of food therefrom. As the cup leaves the hopper and attains a horizontal position, the cam follower is disengaged from the cam and the compressed spring suddenly expands to a lesser degree of compression. This action forces the sleeve radially outward along the shaft until the sleeve contacts the raised portion 13 at which point the sleeve movement is stopped abruptly. Alternatively, the cam follower can contact the bent out portion of the cam to limit the movement of the sleeve in the same manner.

The cup is moved in the same radial direction, and as the sleeve movement is suddenly stopped, the cup movement is also stopped abruptly. As a result, the food (which for example is in the form of quasi-gelatinous particles) carried in the cup is abruptly discharged onto the surface of the water 43 in the aquarium.

I further provide a food agitator element 45 which for convenience is shaped to conform to the inner surface of the hopper. An additional connecting member 47 connects this element to the sleeve 23 at some convenient point, as for example at a point opposite the cup. Thus, as the shaft 11 is rotated, the agitator element serves to stir the particles and prevent any food particles either from adhering to the surface of the hopper or from adhering to each other.

Electric power is supplied through leads 49 and a conventional switch 51 to a lamp 53 mounted on the side of the hopper adjacent the aquarium 9. This switch is secured to the hopper in such manner that the switch is opened and closed through alternate engagement and disengagement with a cam 56 associated with the switch and attached to the shaft 11. Thus, the lamp can be energized at desired intervals for given time periods. I have found that good results are obtained by energizing the lamp for ten minute intervals in such manner that the lamp is energized for about five minutes before the food is supplied to the water and remains energized for about ten minutes thereafter.

The end 32 of cup 31 can be moved to various positions within the cup so as to control the amount of food carried by the cup. Further a food level element, for example an L-shaped element 55 secured to the hopper can be used to remove excess amounts of food from the cup as the cup is moved toward the aquarium, thus insuring that all metered food quantities can be substantially identical. Leg 57 of element 55 is pivoted about point 59 so that leg 57 can be moved out of the path of the scoop as it is swung upward. Leg 57 will then return to its original position through gravitational action.

Fig. 2 shows in detail the manner in which sleeve 23 is adapted to rotate with shaft 11 and at the same time is adapted to move back and forth axially along the shaft. A portion of the shaft 11 is cut away to leave a flatted section 100. The sleeve is keyed to this flat portion by means of a key 101. The sleeve projects forward of key 101 so that when the cup is moved forward, the sleeve (and not the key) strikes the hopper.

While I have shown and pointed out my invention as applied above, it will be apparent to those skilled in the art that many modifications can be made within the scope and sphere of my invention as defined in the claims which follow.

What is claimed is:

1. A fish feeder device comprising a hopper provided with two raised portions secured to opposite sides of said hopper; a rotatable shaft extending between said raised portions and journalled therein; a rotatable member secured at one end to said shaft and extending in a generally radial direction therefrom, said member being positioned between said portions; a cup secured to the other end of said member; a contoured cam secured to said hopper in a location adjacent one of said raised portions; and a cam follower connected at one end to said member at a point intermediate the ends thereof, the other end of said follower cooperating with said cam.

2. A device as set forth in claim 1, further including a sleeve connecting said member to said shaft, said sleeve rotating with said shaft yet being free to move axially along said shaft; a spring concentrically mounted about said shaft and interposed between said sleeve and the other of said raised portions, said cam having a contoured surface at which when said shaft is rotated through a given arc said spring is compressed and when said shaft attains a given angular position said compressed spring is permitted to suddenly expand.

3. A device as set forth in claim 2, further including driving means coupled to said shaft to continuously rotate said cup through a 360° arc, said cup when said compressed spring is permitted to expand being moved in a direction parallel to the axis of said shaft.

4. A fish feeder device comprising a hopper provided with two raised portions secured to opposite sides of said hopper; a rotatable shaft extending between said raised portions and journalled therein; a rotatable member secured at one end to said shaft and extending in a generally radial direction therefrom, said member being positioned between said portions; a cup secured to the other end of said member; a contoured cam secured to said hopper in a location adjacent one of said raised portions; a cam follower connected at one end of said member at a point intermediate the ends thereof, the other end of said follower cooperating with said cam; driving means coupled to said shaft to continuously rotate said cup through a 360° arc; a lamp mounted on said hopper; and means coupled between said lamp and said shaft to actuate said lamp during intervals when said cup is rotated through a selected angular portion of its arc.

5. A device as set forth in claim 4 wherein said coupled means includes a second cam mounted on said hopper and a second cam follower cooperating with said second cam and attached to said shaft.

6. A device as set forth in claim 1, further including a rotatable food agitator connected at one end to said shaft and substantially coplanar with said rotatable member, the other end of said agitator being separated from said rotatable member and said cup; and driving means coupled to said shaft to continuously rotate said cup and said agitator through a 360° arc, said agitator stirring said food as said shaft rotates through a first given portion of said arc, said cup being swept through the food in said hopper as said shaft moves through a second given portion of said arc.

References Cited in the file of this patent

UNITED STATES PATENTS

| 848,101 | Hale | Mar. 26, 1907 |
| 2,002,380 | Wernicke et al. | May 21, 1935 |
| 2,538,421 | Knarreborg | Jan. 16, 1951 |